Patented Aug. 12, 1947

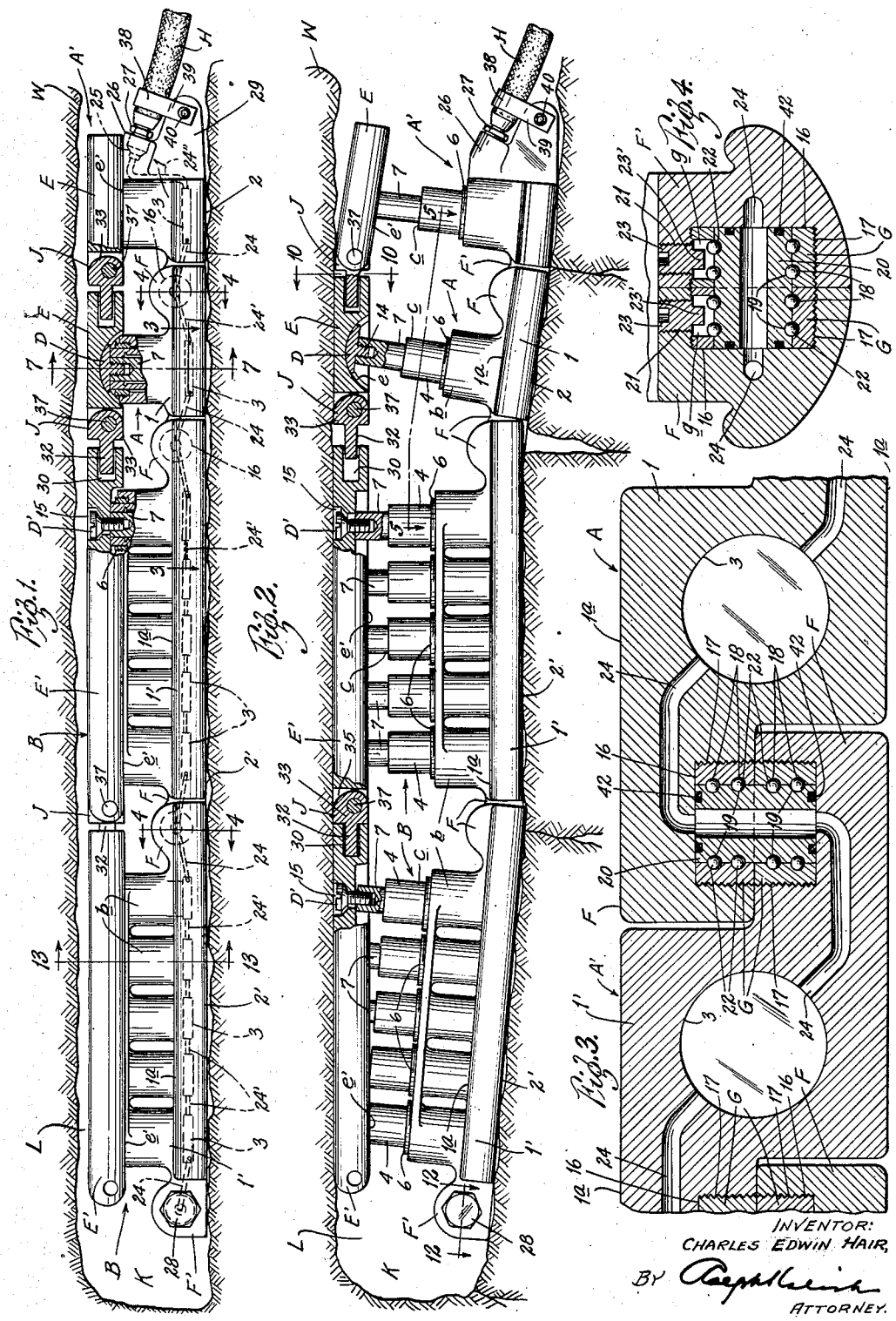

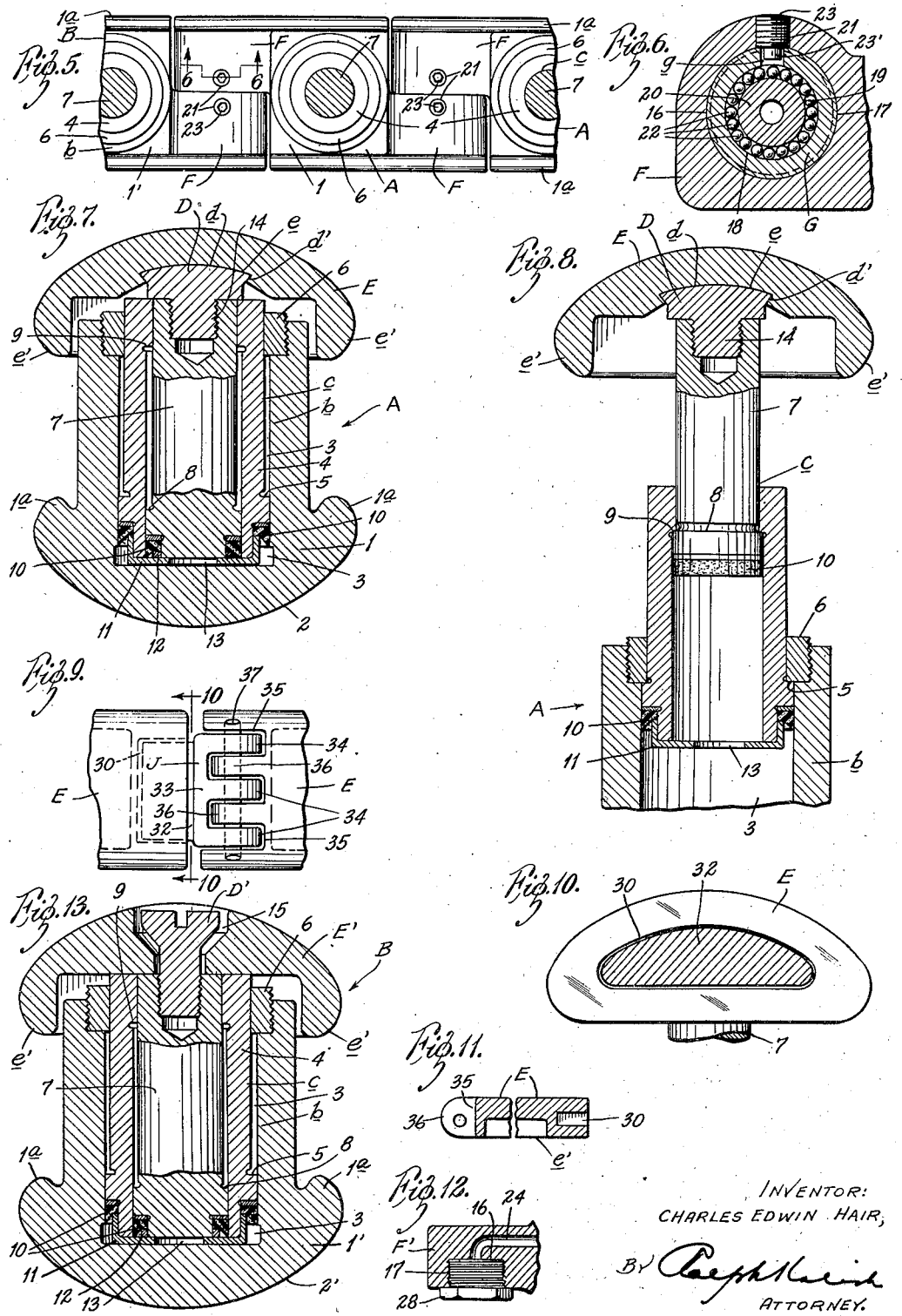

2,425,467

UNITED STATES PATENT OFFICE 2,425,467

COAL-MINING MACHINE

Charles Edwin Hair, Benton, Ill.

Application April 1, 1944, Serial No. 529,106

6 Claims. (Cl. 262—12)

1

This invention relates generally to mining-machines. More particularly, my invention has to do with, and has for its object the improvement generally of, coal-mining machines of the articulated or jointed type specifically illustrated and described in United States Letters Patent Nos. 2,346,676, 2,346,677, 2,346,678, and 2,346,679, all issued on April 18, 1944, to myself and Richard T. Hair, the latter formerly of Benton, Illinois, and now of Franklin, Pennsylvania.

And with the above and other objects in view, my invention resides in the novel features of form, construction, arrangement, and combination of parts presently described and pointed out in the claims.

In the accompanying drawings (two sheets)—

Figure 1 is a side elevational view, partly broken away and in section, of a coal-mining machine constructed in accordance with and embodying my present invention, the several pistons of the machine being in normal or contracted condition and the machine illustrated as disruptingly or dislodgingly disposed in a coal wall or body;

Figure 2 is a similar view of the machine, showing the several units of the machine in successively piston-elongating condition and in variously pivotally shifted relation as in and during the breaking down of the coal-wall or body.

Figure 3 is an enlarged fragmental longitudinal sectional view of the machine taken approximately on the line 3—3, Figure 1;

Figure 4 is an enlarged transverse sectional view of the machine taken approximately on the line 4—4, Figure 1;

Figure 5 is an enlarged detail longitudinal sectional view of the machine taken approximately on the line 5—5, Figure 2;

Figure 6 is an enlarged fragmental sectional view of the machine taken approximately on the line 6—6, Figure 5;

Figure 7 is an enlarged transverse sectional view through one of the single-jack units of the machine, taken approximately on the line 7—7, Figure 1;

Figure 8 is a similar view, illustrating the jack of Figure 7 in fully extended position;

Figure 9 is a slightly enlarged fragmental plan view of the machine;

Figure 10 is a transverse or cross-sectional view of the machine taken approximately on the line 10—10, Figure 2 and Figure 9;

Figure 11 is a reduced broken central longitudinal sectional view through any one of the piston pressure-pads or blocks;

2

Figure 12 is a detail sectional view taken approximately on the line 12—12, Figure 2; and Figure 13 is an enlarged transverse sectional view through one of the multiple-jack units of the machine, taken approximately on the line 13—13, Figure 1.

Referring now in more detail and by reference characters to the drawings, which illustrate a preferred embodiment of my invention, the machine, briefly outlined, preferably includes a series of single and multiple-jack units A and B, each unit A comprising a single jack and each multiple unit B comprising a selected plurality of jacks, and the single and multiple-jack or power units of selected number being hingedly connected one with the other for articulation, all as presently fully appearing. It may be here stated that the machine is preferably built up, for purposes presently stated, to comprise a selected plurality of single-jack units A and a pair of adjoining multiple-jack units B, as illustrated in Figures 1 and 2.

Each unit A consists of a single cylinder $b$ and a single preferably two-part extensible or telescopic reciprocatory plunger or piston $c$. Hence the cylinder-block or body 1 of unit A is preferably of rectangular contour or shape in plan and of selected height and dimensions for strength and rigidity, block 1 preferably having lateral extensions or enlargements 1ª and a transversely disposed rounded or arcuate under face, as at 2, as indicated in Figures 7 and 8, and provided with a cylinder-forming cavity or chamber, as at 3, opening to and upon its upper face.

Piston $c$ is sized for slidable co-operation with cylinder $b$ and telescopically comprises a tubular portion 4 annularly enlarged and thereby provided adjacent its lower end with an annular shoulder, as at 5, for engagement with a ring 6 thread-seated in the upper end of the cylinder-cavity 3 for limiting outward or expanding movement of the piston-portion 4 with respect to the cylinder $b$ and a piston-rod portion 7 similarly enlarged and thereby provided adjacent its lower end with an annular shoulder, as at 8, for engaging with an annular shoulder 9 provided upon, and adjacent the upper end of, the member 4 for similarly limiting outward or expanding movement of the piston 7 with respect to the tubular member 4. It might be here mentioned that the cylinder $b$ and the piston $c$ are so relatively proportioned and sized as to be completely nested when in normal or contracted condition, as best seen in Figures 1, 7, and 13, and to have a stretch of approximately three inches when in abnormal or fully expanded or extended condition, as best seen in Figure 8.

At their respective lower ends, it may be here mentioned, the piston-members 4, 7, are annularly reduced, as best seen in Figures 7 and 8, for accommodating suitable cylinder-wall engaging or sealing ring-assemblies 10, 10, preferably held in place by a suitably sized flanged cap 11 and an interposed ring 12, the cap 11 being apertured in its end wall, as at 13, for purposes presently appearing.

Each multiple-jack unit B, in turn, includes a suitably elongated generally oblong-rectangular block 1' preferably similarly laterally enlarged, as at 1a, continuously rounded or of arcuate contour on its under face, as at 2', and suitably cored in the provision of a selected plurality of the cylinders b disposed in a line in parallel relation, working in each of which is a piston c. It will be understood that the unit B may comprise a selected plurality of the cylinders b and pistons c. Preferably, as here shown, and for example, each unit B has five pairs of companion or co-operable cylinders b and reciprocatory pistons c.

Threadedly engaged, as by a projecting stud 14, with, and seated upon the upper or free end of, each of the piston-rods 7 of the several units A, is a head D constructed of any suitable preferably metallic material, rounded or arcuate upon its upper face, as at d, and cut away and shouldered upon its perimeter, as at d', for smoothly and snugly fitting the correspondingly arcuately shaped and under-cut under face e of a suitable pressure-pad or block E, which is preferably of rectangular outline or contour in plan and of suitable length for co-operable engagement with a single piston-head D. Thus, as seen in Figure 2, the block 1, cylinder b, and piston c of each single jack unit A may, with respect to its pressure-pad E and as presently more fully appears, tilt in the longitudinal direction of the machine.

In the case of a multiple-jack unit B, the block or pad E' is preferably also of oblong-rectangular outline or contour in plan, but is suitably elongated for co-operable engagement with the plural pistons c of the particular unit, as best seen in Figures 1, 2, and 13, and for such purpose, the block or pad E' is suitably provided in proper or co-operatively spaced relation along its length with one or more openings 15 for each freely or loosely accommodating a portion of a head D' similarly threadedly engaged with particular piston c. Thus the block E' becomes a detachable part of the particular unit B, the opening 15 having such shape and dimensions relatively to the head D' that the pistons c of the unit may also tilt somewhat relatively to the block E' and likewise in the longitudinal direction of the machine, the block or pad E or E' having a transversely disposed arcuate upper face, all for purposes presently fully appearing.

As in the machine of said Patent No. 2,346,679, the cylinder-forming block or body 1 or 1' of each unit, except the one end unit A', of a machine is provided in the plane of its lower half and upon its opposite sides with angularly opposed somewhat rectangular extensions F, which project lengthwise of the particular unit, while the cylinder-forming block or body 1 of each end unit A' of the machine is likewise provided in the plane of its lower half, but merely upon its left side, as seen in Figures 1 and 2, with a similar oblong-rectangular extension F', which also projects lengthwise of the particular unit, each extension F, F', being formed or provided upon its inner face with a cavity or recess, as at 16, having an annular side wall threaded, as at 17, for seating a ring G correspondingly threaded upon its outer periphery and provided circumferentially upon its inner periphery with a pair of suitably spaced ball-grooves or outer races 18, 18, co-operable with opposed companion ball-grooves or inner races 19 formed circumferentially upon the outer peripheral face of a tubular wrist-pin 20, which latter has a length equal to the combined width of two of the rings G and with which rings G the pin 20 is co-operable in hingedly joining together two units of the machine.

As best seen in Figures 3, 4, and 6, each body or block extension F, F', is formed in a side face thereof with a threaded aperture, as at 21, which at its inner end opens into a groove-communicating recess or cavity g in the ring G and through which aperture 21 and cavity g suitable spheres or balls 22 may be poured to seat within the races formed by the companion grooves 18—19, the aperture 21 being, in turn, closed by a threaded plug 23 having a shank or end-projection 23' of sufficient diametrical dimension for retaining the spheres 22 to their respective races.

Formed in the base of the cylinder-block 1 of each respective unit A of the machine and communicating at one end with a respective recess or cavity 16 and at its opposite end with its cylinder chamber 3, as best seen in Figure 3, are opposed hydraulic or other suitable fluid channels 24, 24.

Likewise formed in the base of the cylinder block 1' of each respective unit B of the machine and communicating at one end with a respective recess or cavity 16 and at its opposite end with the adjacent end cylinder-chamber 3 of the respective block, as also seen in Figure 1, are similar opposed fluid channels 24, 24', the latter being longitudinally extended through the particular block and from cylinder to cylinder, as shown, for communicating the interior of the several cylinders of each such block one with the other.

And similarly formed or provided in the end unit A' of the machine is a hydraulic or other suitable fluid channel 24" communicating at its inner end with the single cylinder-chamber 3 of the unit and at its outer end opening into a small chamber 25 formed in a block enlargement 26 and internally threaded for accommodating a nipple or the like 27 for communicating connection, as by means of a flexible hose or tubular section H, with a suitable source of piston-actuating fluid supply. At the opposite end of the machine, a suitable plug or the like 28, as shown in Figure 12, is thread-seated in the end-member F' for closure of the end fluid-channel 24. Preferably the end unit A' is provided with a longitudinally outwardly presented relatively thick or block-shaped ear 29, for purposes shortly appearing.

And in joining one unit A or B to an adjoining or adjacent unit, a ring G is thread-seated in each respective cavity or recess 16 of companion extensions F or F', a tubular wrist-pin 20 fitted within one of such rings G, the extensions F or F' of the particular jacks then disposed with their inner faces in overlapping relation, and the exposed portion of the particular wrist-pin 20 then seated in the companion ring G of the particular joint, when the races 18—19 so formed are filled with the spheres or balls 22, as previously described.

It will be noted that the wrist pins 20 are lengthwise disposed in right-angular relation to the pistons c and their accommodating cylinders b, and thus adjacent or adjoining units of a machine are hingedly joined or connected for relative articulation, the balls or spheres 22 functioning not only as anti-friction members for facilitating hinged movements or articulations of the respective units, but in also retaining such units in such hinged or articulate relation.

As best seen in Figures 7, 8, and 13 the blocks or pads E, E' are extended at and along their opposite side margins to hoodwise or umbrellawise project downwardly, as at e', over the piston or pistons c of the particular unit and for unit strengthening or re-enforcing purposes, the upper and lower block lateral extensions e' and 1ª also increasing the bearing area of the particular block with respect to the hole in the coal-wall within which it may be disposed, as presently more fully appears.

In addition, the pads E, E' are formed at one end, as best seen in Figures 1, 2, 9, and 10, with a recess or opening, as at 30, of a shape in transverse section and of a depth to slidably accommodate a correspondingly shaped tongue or shank 32 of a rigid coupling-member J, which includes a head 33 forked or bifurcated to comprise fingers 34 loosely fitting in companion slots or bifurcations 35 formed for the purpose in the opposite end of the adjacent block E or E', as the case may be. Engaging the fingers 34, 36 of such companion or adjoining blocks are transversely disposed connecting pivot-pins 37.

Thus the blocks or pads E, E' of the several units of the machine are coupled together for, while freely permitting unit articulation, forming a continuous unit hood extending in a substantially unbroken manner from end to end of the machine for purposes presently appearing.

It will further be noted that, in so hingedly connecting adjoining units for relative articulation, the tubular wrist-pins 20 align or register with respective fluid channels of the units, and hence the expanding actuating fluid entering the channel 24' of the end unit A' flows into and through its cylinder-chamber 3 and then, in succession, through the several units of the machine and is suitably, by vacuum or otherwise, drained back to the source of supply, as presently appears, the several pistons c of the several units being telescopically extended in sequence as the actuating fluid thus flows in expanding direction from one unit to the next unit of the particular machine.

Accordingly, in use and operation, a kerf K is suitably formed or produced in or adjacent the bottom level of the particular wall or body W of coal being mined, and in suitably spaced relation upwardly from the kerf K a desired plurality of suitably spaced holes L of desired depth are formed in the coal-body W. The greatest breaking force in a coal dislodging operation is required at the inner or so-called closed end of the particular holes L. Hence machines of my invention are then lengthwise disposed in selected holes L with the main power or multiple-jack units B foremost for exerting the greatest breaking force at the closed end of the hole L, the several pistons c of the respective units A and B being in contracted condition or in the condition thereof illustrated in Figures 1, 7, and 13.

The tube or pipe H of the end unit A' of the particular machine is suitably connected with a source of fluid supply, and the fluid in sufficient volume or amount led into the successive cylinders b of the several units of the machine. Then, as the pistons c of the several units are thus successively elongated or extended, that portion of the coal wall W intermediate the kerf K and the holes L is, under the relatively great pressure exerted thereupon through the pivotally connected pads or blocks E, E', under the expanding or elongating pistons c, successively disrupted and dislodged, as indicated in Figure 2, and its removal from the mine thereby conveniently facilitated.

In such a dislodging operation, the pads or blocks E, E', are shifted outwardly or upwardly by the elongating pistons c throughout their expanding stroke and, at the same time, the several pads or blocks E, E', may rock or shift, within limits, lengthwise or longitudinally of the machine with respect to the several pistons c, and, in addition, the pivot or hinge-coupling between the several blocks I, I', and also the sliding connection provided by the coupling-members J between the several blocks E, E', of the several units of a machine readily permit a hingedly shifting movement in graduated increasing amount from the base of each unit to its particular pressure pad, with the result that, as the coal shifts under the disrupting pressure exerted thereon by the several pads or blocks E, E', imparted by the power exerted by the successively expanding pistons c of each successive unit, any one or more of the units of the machine may articulate or move hingedly with respect to the remaining units. In all such movements, the outward movement of the several pistons c is limited and controlled by the companion shoulder couplets 5—6 and 8—9, the pads or blocks E, E', of the several units freely rocking or shifting, as described, with the breaking coal.

Thus the machine augments and facilitates shifting movement of the dislodged coal, and at the same time the relative flexibility of the several units eliminates and obviates breaking of the machine in or by shifting movement of the disrupting coal, the respective arcuate faces of the respective blocks or pads E, E', and of the respective blocks or bases I, I', and the hinged coupling-members J facilitating engagement of the machine with the coal-body, as well as subsequent movement of the respective units, under the shifting movement of the disrupted coal.

On a draining back of the motive fluid, the pistons c of the several units will automatically return to normal contracted condition, when the machine may be easily removed for successive like operations.

In all such shifting movements of the respective units of a particular machine, the hose connection H is protected from injury or damage by the underlying ear 29 of the end unit A and also re-enforced and protected from damage or breakage during mining operations as by means of an inverted U-shaped brace or guard 38 having its opposite arms 39 disposed on opposite sides of, and by means of a pin or the like 40 pivotally secured to, the ear 29.

It may be remarked that the present machine comprises, in effect, three base castings, namely, the base casting of the end unit A', the base castings I of the units A, and the base casting of the units B, and two hood castings, namely, the pads or blocks E, E'. The machine may be thus economically constructed, and, as shown in Figure 4, the pins 20 are preferably suitably equipped with sealing gaskets 42.

It is to be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. In a mining-machine, a pair of power-units, each unit including a co-operable cylinder and reciprocatory piston, means joining the cylinders for unit articulation, pressure-pads mounted on and movable with the respective pistons, and means comprising a rigid member having a movable connection with the pads for coupling the pistons for accommodating unit articulation.

2. In a mining-machine, a pair of power-units, each unit including a co-operable cylinder and reciprocatory piston, means joining the cylinders for unit articulation, pressure-pads mounted on and movable with the respective pistons, and means comprising a rigid member having pivot connection with one pad and sliding connection with the other pad for coupling the pistons together for accommodating unit articulation.

3. In a mining-machine, a pair of power-units, each unit including a co-operable cylinder and reciprocatory pistons, means joining the cylinders for unit articulation, pressure-pads mounted on and movable with the respective pistons, one pad having an end recess and the other pad having a forked extension, and means comprising a rigid member having a shank disposed slidably in said recess and spaced fingers pivotally engaged with said extension for coupling the pistons for accommodating unit articulation.

4. In a mining-machine, a pair of power-units, each unit including a co-operable cylinder and a reciprocatory piston, means joining the cylinders for unit articulation, pressure-pads mounted on and movable with the respective pistons, said pads being spaced one from the other, and means comprising a rigid member connected for movement with and relatively to the pads for hingedly bridging the space therebetween.

5. In a mining-machine, a pair of power-units, each unit including a co-operable cylinder and a reciprocatory piston, means joining the cylinders for unit articulation, pressure-pads mounted on and movable with the respective pistons, said pads being spaced one from the other, and means comprising a rigid member movably connected with, and disposed intermediate, the pads for forming with the pads a substantially continuous articulated pressure-hood.

6. In a mining-machine, a pair of power-units, each unit including a co-operable cylinder and reciprocatory pistons, means joining the cylinders for unit articulation, a first pressure pad having an end recess, a second pressure pad having a forked extension, and means comprising a rigid member having a shank of cross-sectional shape complementary to the cross-sectional shape of the end recess, said shank being disposed slidably in said recess, and spaced fingers pivotally engaged with said extension for coupling the pistons for accommodating unit articulation.

CHARLES EDWIN HAIR.

REFERENCES CITED

The following references are of record in the file of this patent:

UNITED STATES PATENTS

| Number | Name | Date |
|---|---|---|
| 590,973 | Gass | Oct. 5, 1897 |
| 2,346,679 | Hair | Apr. 18, 1944 |

FOREIGN PATENTS

| Number | Country | Date |
|---|---|---|
| 1,482 | Great Britain | May 6, 1868 |
| 2,522 | Great Britain | 1886 |
| 8,392 | Great Britain | 1913 |
| 397,746 | Germany | July 11, 1924 |